Patented Nov. 17, 1931

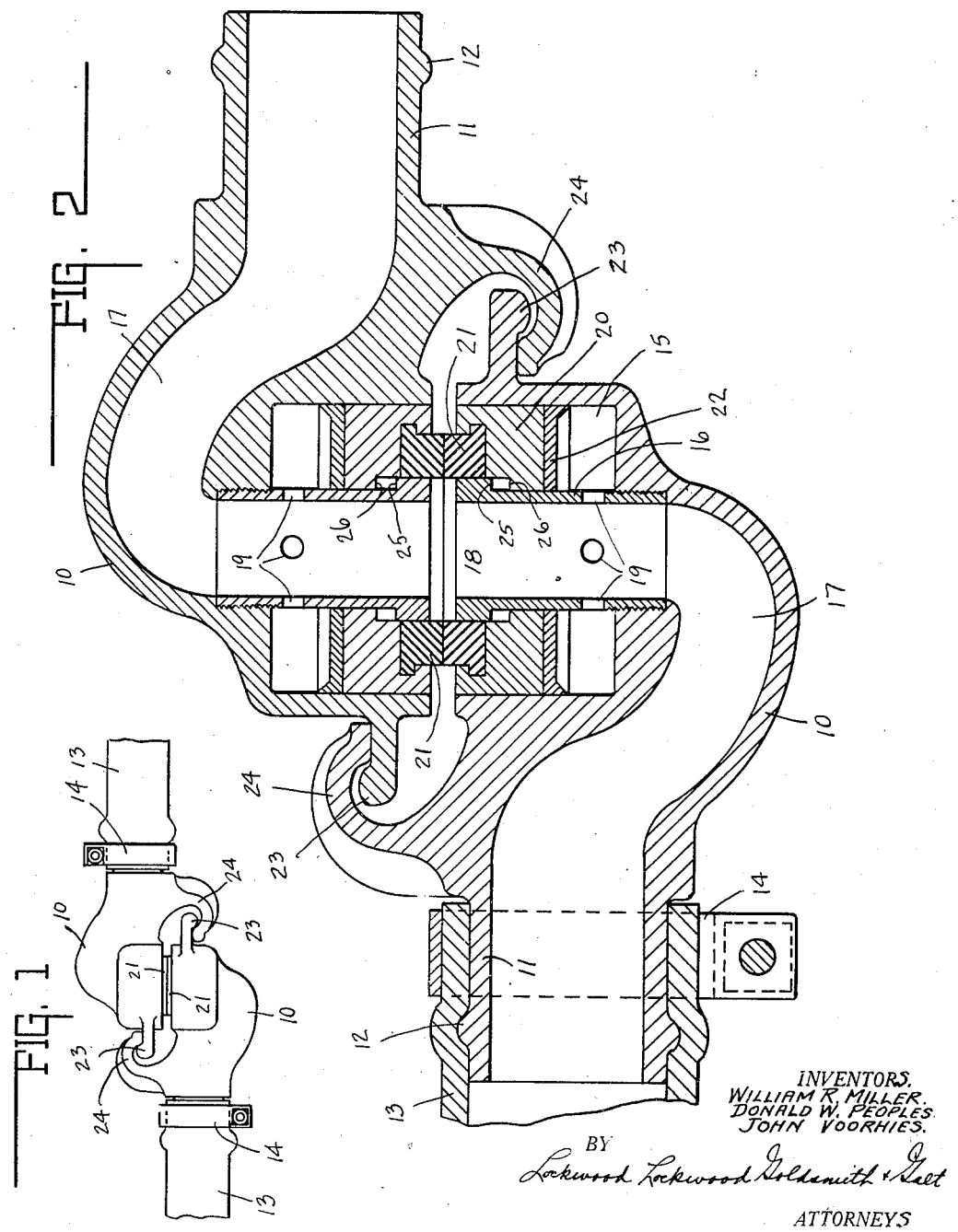

1,832,435

UNITED STATES PATENT OFFICE

JOHN VOORHIES, WILLIAM R. MILLER, AND DONALD W. PEOPLES, OF INDIANAPOLIS, INDIANA

FLUID CONDUIT COUPLING

Application filed October 19, 1929. Serial No. 400,878.

This invention relates to a coupling for fluid conduits. More particularly it relates to a type of coupling to be used in connecting the brake pipes in adjacent railroad cars or for any similar use where it is important that a fluid tight connection between fluid conduits may be quickly made and broken.

The principal object of the invention is to provide a conduit coupling wherein the pressure of the fluid in the conduit is exerted to assist in the sealing of the joint between couplings.

The principal feature of the invention resides in the provision of a coupling including a housing having a fluid port, a chamber surrounding the port and communicating therewith, a resilient sealing ring surrounding the port and a movable member in the said chamber movable responsive to the pressure of the fluid to press the sealing ring against the similar sealing ring in a mating conduit. The construction of the device is such that the coupling may be used either with a similar coupling or with a coupling of the type now in common use.

Other objects and features and the full nature of the invention will be fully understood from the accompanying drawings and the following description and claims:

Fig. 1 is a plan view of a pair of mating couplings in the engaged relation. Fig. 2 is a horizontal central sectional view of the said couplings showing the internal construction.

In the drawings, each coupling includes a housing 10 having the usual shank 11 and bead 12 for the attachment of a flexible hose 13 by means of a clamp 14. In the body of each housing 10 is formed a chamber 15 having a hollow cylindrical member 16 centrally located therein. The member 16 is threadedly connected to the body portion 10 and the interior thereof connects with the passageway 17 in the body portion in turn connecting with the internal passage of the hose 13. The outer end 18 of the cylindrical member 16 serves as a port for the passage of the fluid between couplings. The cylindrical member 16 is fitted with openings 19 communicating with the chamber 15. Within the chamber 15 is a movable annular member 20 having its outer surface substantially fitting the inner surface of the chamber 15 and its inner surface loosely fitting the outer surface of the cylindrical member 16. The annular member 20 carries a sealing ring 21 of rubber or other resilient material. A cup-shaped sealing member 22 of leather or other suitable material is fastened to the member 20 and serves to prevent passage of fluid between the said member and the inner wall of the chamber 15. If desired, piston rings or other similar sealing means may be used for the same purpose. Each of the housings 10 is fitted with the usual interlocking members 23 and 24 for locking together the two couplings.

In the operation of the device, when the two couplings are positioned as illustrated in the drawings, the fluid passing through the ports 18 may enter the chambers 15 through the openings 19. Pressure is exerted thereby on the sealing members 22 and is in turn transmitted through the annular members 20 to the resilient sealing rings 21. The two sealing rings are thereby pressed tightly together and provide a fluid tight joint between the couplings.

The type of coupling in common use is provided with a stationary sealing ring surrounding the fluid port. It is evident, therefore, that one of the couplings as described herein could be used in connection with such a coupling, the sealing ring 21 pressing directly upon the stationary sealing ring of the mating coupling.

To prevent loss of the sealing ring and annular member 20 when the couplings are not connected together, a shoulder 25 is provided on the cylindrical member 16 engaging a shoulder 26 provided on the annular member 20. The said shoulders are so positioned that they are in engagement only when the couplings are not connected. In the normal position of the connected couplings as illustrated in the drawings there is no contact between the shoulders.

The invention claimed is:

1. A fluid conduit coupling including a housing having a fluid port and a chamber communicating with said port, a movable member in said chamber surrounding said port, and a resilient sealing ring, said movable member being movable in response to the pressure of fluid in said chamber to press said sealing ring against a portion of a mating coupling for sealing the joint between said couplings.

2. A fluid conduit coupling including a housing having a fluid port and a chamber communicating with said port, a movable member in said chamber surrounding said port, a sealing means for preventing passage of fluid between said member and the internal walls of said chamber, and a resilient sealing ring, said movable member being movable in response to the pressure of fluid in said chamber to press said sealing ring against a portion of a mating coupling for sealing the joint between said couplings.

3. A fluid conduit coupling including a housing having a fluid port and a cylindrical chamber surrounding said port and communicating therewith, a movable annular member in said chamber surrounding said port, sealing means for preventing passage of fluid between said member and the internal walls of said chamber, and a resilient sealing ring, said movable member being movable in response to the pressure of fluid in said chamber to press said sealing ring against a portion of a mating coupling for sealing the joint between said couplings.

4. A coupling for fluid conduits including a pair of interlocking housings each associated with a conduit, said housings having fluids ports positioned adjacent each other when said housings are interlocked and each having a chamber communicating with its corresponding port, a resilient sealing ring surrounding each of said ports, and a movable piston in each chamber surrounding the corresponding port and operable by the pressure of the fluid in said conduits to press said rings together for the formation of a fluid tight joint.

In witness whereof, we have hereunto affixed our signatures.

JOHN VOORHIES.
WILLIAM R. MILLER.
DONALD W. PEOPLES.